US011595888B2

(12) United States Patent
Frenger et al.

(10) Patent No.: US 11,595,888 B2
(45) Date of Patent: Feb. 28, 2023

(54) METHOD AND ARRANGEMENT FOR REDUCING POWER CONSUMPTION IN A MOBILE COMMUNICATION NETWORK

(71) Applicant: TELEFONAKTIEBOLAGET L M ERICSSON (PUBL), Stockholm (SE)

(72) Inventors: Pål Frenger, Linköping (SE); Per Magnusson, Linköping (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 16/713,547

(22) Filed: Dec. 13, 2019

(65) Prior Publication Data
US 2020/0120599 A1 Apr. 16, 2020

Related U.S. Application Data

(63) Continuation of application No. 16/440,953, filed on Jun. 13, 2019, now Pat. No. 10,536,898, which is a
(Continued)

(30) Foreign Application Priority Data

Jan. 17, 2006 (SE) .................... 0600085-5

(51) Int. Cl.
*H04W 52/02* (2009.01)
*H04W 52/28* (2009.01)
(Continued)

(52) U.S. Cl.
CPC ....... *H04W 52/0206* (2013.01); *H04L 5/0055* (2013.01); *H04W 52/0216* (2013.01);
(Continued)

(58) Field of Classification Search
CPC ......... H04W 52/0206; H04W 52/0238; H04W 68/02; H04W 52/0216; H04W 52/0219;
(Continued)

(56) References Cited

U.S. PATENT DOCUMENTS

| 4,955,038 A | 9/1990 | Lee et al. |
| 4,961,073 A | 10/1990 | Drapac |

(Continued)

FOREIGN PATENT DOCUMENTS

| EP | 0907262 A2 | 4/1999 |
| EP | 1 571 785 A2 | 9/2008 |

OTHER PUBLICATIONS

Universal Mobile Telecommunications System (UMTS); UE Procedures in Idle Mode and Procedures for Cell Reselection in Connected Mode (3GPP TS 25.304 version 5.3.0 Release 5). ETSI TS 125 304 V5.3.0 (Jun. 2003).
(Continued)

*Primary Examiner* — Ankur Jain

(57) ABSTRACT

A method of operating a wireless communication device in a wireless communication network is disclosed. The wireless communication device transitions between a plurality of modes, wherein the plurality of modes further includes a sleep mode, wherein the wireless communication device does not listen for downlink data transmissions, and the plurality of modes further includes an active mode, wherein the wireless communication device listens for downlink data transmissions. While the wireless communication device is operating in the active mode, it receives control signalling from a transmitter to adjust a length of time for transitioning between a first mode among the plurality of modes and a second mode among the plurality of modes based on one or more sleep rules. The wireless communication device tran-
(Continued)

sitions from the first mode to the second mode based, at least in part, on the adjusted length of time.

24 Claims, 2 Drawing Sheets

Related U.S. Application Data continuation of application No. 15/688,229, filed on Aug. 28, 2017, now Pat. No. 10,356,712, which is a continuation of application No. 14/691,666, filed on Apr. 21, 2015, now Pat. No. 9,769,745, which is a continuation of application No. 14/187,403, filed on Feb. 24, 2014, now Pat. No. 9,119,148, which is a continuation of application No. 13/444,270, filed on Apr. 11, 2012, now Pat. No. 8,694,061, which is a continuation of application No. 12/161,280, filed as application No. PCT/SE2006/050457 on Nov. 7, 2006, now Pat. No. 8,180,408.

(51) Int. Cl.
  *H04L 5/00* (2006.01)
  *H04W 68/02* (2009.01)
(52) U.S. Cl.
  CPC ... *H04W 52/0219* (2013.01); *H04W 52/0238* (2013.01); *H04W 52/28* (2013.01); *H04W 68/02* (2013.01); *H04W 52/286* (2013.01); *H04W 52/287* (2013.01); *Y02D 30/70* (2020.08)
(58) Field of Classification Search
  CPC . H04W 52/28; H04W 52/286; H04W 52/287; H04L 5/0055; Y02D 30/70
  See application file for complete search history.

(56) References Cited

U.S. PATENT DOCUMENTS

| | | |
|---|---|---|
| 4,964,121 A | 10/1990 | Moore |
| 5,109,530 A | 4/1992 | Stengel |
| 5,115,236 A | 5/1992 | Kohler |
| 5,241,542 A | 8/1993 | Natarajan et al. |
| 5,278,831 A | 1/1994 | Mabey et al. |
| 5,355,518 A | 10/1994 | Kindinger et al. |
| 5,473,319 A | 12/1995 | Asai |
| 5,566,081 A | 10/1996 | Yoshizawa et al. |
| 5,606,728 A | 2/1997 | Keba et al. |
| 5,744,874 A | 4/1998 | Yoshida et al. |
| 5,745,860 A | 4/1998 | Kallin |
| 5,767,588 A | 6/1998 | Nakaya et al. |
| 5,790,946 A | 8/1998 | Rotzoll |
| 5,838,257 A | 11/1998 | Lambropouios |
| 5,883,885 A | 3/1999 | Raith |
| 6,037,675 A | 3/2000 | Yoshida et al. |
| 6,212,398 B1 | 4/2001 | Roberts et al. |
| 6,236,674 B1 | 5/2001 | Morelli et al. |
| 6,236,850 B1 | 5/2001 | Desai |
| 6,532,259 B1 | 3/2003 | Bush |
| 6,570,857 B1 | 5/2003 | Haartsen et al. |
| 6,741,836 B2 | 5/2004 | Lee et al. |
| 6,754,513 B1 | 6/2004 | Ilg |
| 6,829,496 B2 | 12/2004 | Hunzinger |
| 6,880,096 B2 | 4/2005 | Sumida |
| 6,882,286 B1 | 4/2005 | Yamamoto |
| 7,254,725 B2 | 8/2007 | Forstl |
| 7,295,827 B2 * | 11/2007 | Liu .................. G06F 1/3209 455/343.2 |
| 7,551,057 B2 | 6/2009 | King et al. |
| 7,656,853 B2 | 2/2010 | Albulet |
| 7,668,129 B2 | 2/2010 | Alon et al. |
| 7,733,835 B2 | 6/2010 | Sammour et al. |
| 7,881,755 B1 | 2/2011 | Mishra et al. |
| 7,885,690 B2 | 2/2011 | Shen et al. |
| 7,899,076 B2 | 3/2011 | Lai |
| 7,916,687 B2 | 3/2011 | Deshpande et al. |
| 2004/0235536 A1 * | 11/2004 | Kim .................. H04W 52/0216 455/574 |

OTHER PUBLICATIONS

Universal Mobile Telecommunications System (UMTS); Radio Ressource Control (RRC) protocol specification (3GPP TS 25.331 version 5.0.0 Release 5). ETSI TS 125 331 V5.0.0 (Mar. 2002).

* cited by examiner

METHOD AND ARRANGEMENT FOR REDUCING POWER CONSUMPTION IN A MOBILE COMMUNICATION NETWORK

CROSS-REFERENCE TO RELATED APPLICATIONS

This application is a continuation of pending U.S. application Ser. No. 16/440,953, filed on Jun. 13, 2019, which was a continuation of U.S. application Ser. No. 15/688,229, filed on Aug. 28, 2017, granted as U.S. Pat. No. 10,356,712 on Jul. 16, 2019, which was a continuation of U.S. application Ser. No. 14/691,666, filed on Apr. 21, 2015, granted as U.S. Pat. No. 9,769,745 on Sep. 19, 2017, which was a continuation of U.S. application Ser. No. 14/187,403, filed Feb. 24, 2014, granted as U.S. Pat. No. 9,119,148 on Aug. 25, 2015, which was a continuation of U.S. application Ser. No. 13/444,270, filed Apr. 11, 2012, granted as U.S. Pat. No. 8,694,061 on Apr. 8, 2014, which was a continuation of U.S. application Ser. No. 12/161,280, filed Jul. 17, 2008, granted as U.S. Pat. No. 8,180,408 on May 15, 2012, which was the National Stage of International Application No. PCT/SE06/50457, filed Nov. 7, 2006, which claims the benefit of SE Application No. 0600085-5, filed Jan. 17, 2006, the disclosures of which are incorporated herein by reference.

TECHNICAL FIELD

The present invention generally relates to a mobile communication network and, in particular, to an arrangement allowing for reducing power consumption in a mobile terminal as well as a method for such reduction. The invention further relates to a computer-readable medium containing computer program for reducing power consumption in a mobile terminal.

BACKGROUND OF THE INVENTION

In packet transmission systems, the data is organized into packets and transmitted along with control information such as the size (or start and end) of the data, and the identity of the receiver (at least when communicating over shared media). In many systems the time is divided into time frames, where each frame carries zero or more packets, along with the mentioned control information.

A receiver in such a system monitors the transmitted control information for the presence of packets that should be received by that receiver. In situations where the bitrate required by the application is much lower than the transmission bitrate, the receiver is most of the time essentially idle, just monitoring the control information.

Examples of the above include all existing cellular packet transmission techniques, i.e. GPRS/EDGE, WCDMA (R99, HSDPA, and E-UL), and CDMA2000 (1x, Ev-DO, and Ev-DV).

With many transmission technologies, actively monitoring the control information can be very power consuming, even if the control information itself contains little information and there is no data that needs to be received. For example, a wideband radio transmission technique, designed for high data bit rates, may require that the receiver demodulates and processes the entire frequency band even though it is only interested in the control information. This is the case, e.g. for WCDMA HSDPA and may well turn out to be the case for OFDM-based systems such as the long-term evolution (LTE) of UMTS.

This means that for a low-rate service (such as voice) the power consumption can be significantly larger when using a wideband system compared to a narrowband system.

If the mobile terminal occasionally could enter a "sleep mode", meaning that it does not monitor the control information during a period of time, power consumption could be reduced. This type of sleep mode is currently used when the mobile terminal has entered a paging state. In paging state the mobile terminal only occasionally listens for a "wake up" or "paging" signal, from the network. However this method requires additional signaling between the network and the mobile terminal, in order to "wake it up", and wouldn't be appropriate to use for short time intervals e.g. between successive packets in an ongoing real-time data session.

SUMMARY OF THE INVENTION

Accordingly, it is an objective with the present invention to provide an improved method for reducing power consumption of a receiver in a mobile communication network comprising a sender transmitting packet data on a downlink channel to one or more receivers over a radio interface.

Another objective with the present invention is to provide an improved arrangement for reducing power consumption of a receiver in a mobile communication network comprising a sender transmitting packet data on a downlink channel to one or more receivers over a radio interface.

A further objective with the present invention is to provide an improved computer-readable medium for reducing power consumption of a receiver in a mobile communication network comprising a sender transmitting packet data on a downlink channel to one or more receivers over a radio interface.

These and other embodiments are achieved through the attached claims.

Thanks to the provision of defined sleep rules, the power consumption in mobile terminals is reduced and, thus, the battery life is increased.

The network and the terminal agree on a rule that specifies time instants when the network may not transmit anything to the terminal, thereby allowing the terminal to disable receiving processing. No extra signaling is needed when the terminal should listen for control information, thus enabling this technique to be used on a very short time interval, e.g. between successive packets in an ongoing real-time session. Further, the proposed rule principles, as well as selection algorithms, are designed to work well during ongoing sessions.

When running a low-rate service over a wideband system, the sender and receiver agrees on a sleep rule that prescribes when the sender may send packets to the receiver and when it may not do so. Such a rule would typically specify relatively long periods when no packets should be transmitted to the receiver, allowing the receiver to stop monitoring the media for control information.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF PREFERRED EMBODIMENTS

Figure 1:
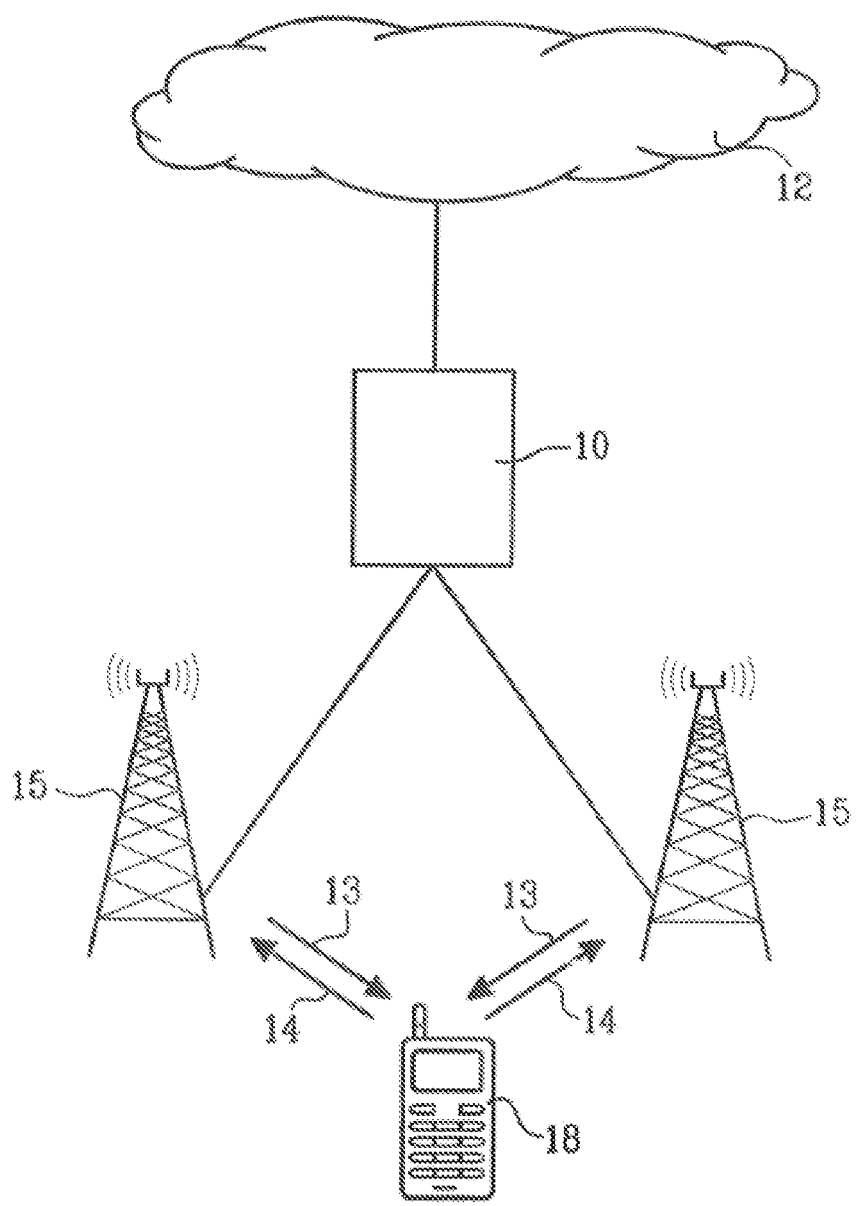
FIG. 1 shows an exemplary block diagram over a communication network.

FIG. 1 depicts a communication system, such as a WCDMA communication system, including a Radio Access Network (RAN), such as the UMTS Terrestrial Radio Access Network (UTRAN) architecture, comprising at least one Radio Base Station (RBS) (Base Station (BS) or Node B) 15 connected to one or more Radio Network Controllers (RNCs) 10. The RAN is connected to a Core network (CN) 12. The RAN and the CN 12 provide communication and control for a plurality of user equipments (UE) 18 (only one is shown in FIG. 1), that each uses downlink (DL) channels 13 (i.e. base-to-user or forward) and uplink (UL) channels 14 (i.e. user-to-base or reverse). On the downlink channel 13, the RBS 15 transmits to each user equipment 18 at respective power level. On the uplink channel 14, the user equipments 18 transmit data to the RBS 15 at respective power level. According to a preferred embodiment of the present invention, the communication system is herein described as a WCDMA communication system. The skilled person, however, realizes that the inventive method and arrangement works very well on any packet based system.

A sleep rule should be setup between a pair of sender and receiver. In the sender, the rule specifies when the sender is allowed to transmit packets to the receiver. These time instants will be referred to as the active awake periods, while the remaining time instants will be called active sleep periods (inactive periods). During active sleep periods, the receiver can turn off its reception, demodulation, and processing hardware and software, thereby saving power.

The active sleep mode according to the invention is different from the inactive sleep mode according to prior art. In the prior art inactive sleep mode, the terminal is only listening on a paging channel and is typically assigned a long Radio Network Temporary Identifier (RNTI). The terminal needs a wake-up message on the paging channel to be able to receive any information. In order to achieve an effective scheduling, the terminal needs a shorter RNTI, which requires additional signaling.

In the active sleep mode according to the present invention, the terminal typically has a short RNTI, but it is not possible to address the terminal unless it is in an active awake mode. However, the transition from the active sleep state to the active awake state requires no signaling at all.

If the active awake periods of two or more terminals are configured such that they do not overlap in time then it is possible to use the same short RNTI for all these terminals. The base station may then use the shared short RNTI in the transmission time interval corresponding to active awake period of the terminal it needs to address. This can be used to increase the efficiency of the control signaling since there is only a limited number of unique RNTI sequences of any given length, and in order for the control signaling to consume little resources the short RNTIs shall be of as short length as possible.

Figure 2:
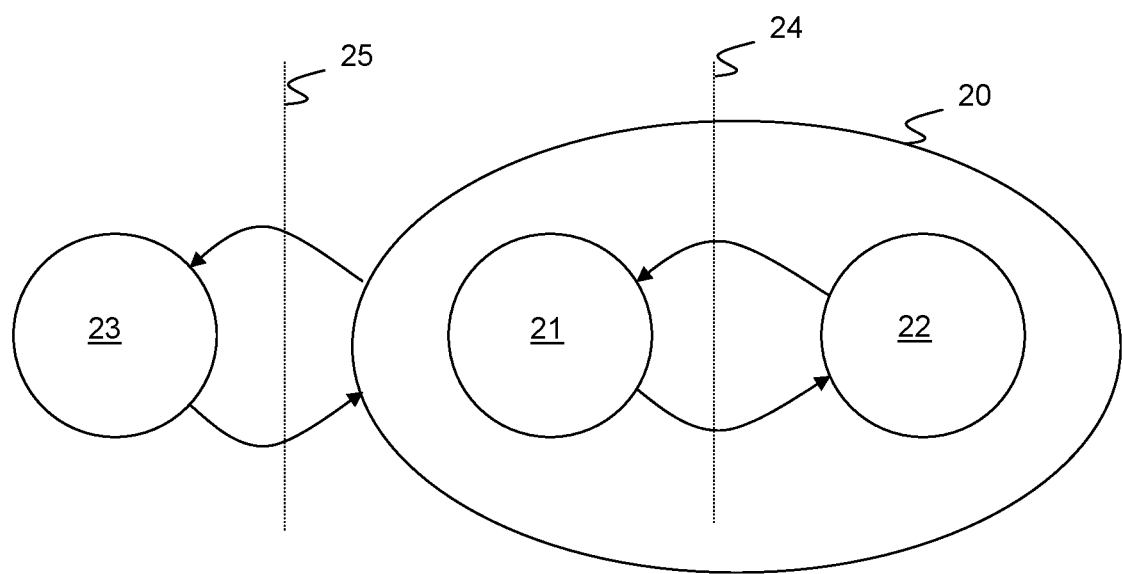
FIG. 2 shows a state diagram of a user equipment having the present invention implemented.

FIG. 2 shows a state diagram, in which an active state of the UE is denoted with 20. When the UE is active, it is assigned a short Radio Network Temporary Identifier (RNTI) and may send and receive data. According to the present invention, the active state 20 has been divided into an active awake state 21 and an active sleep state 22.

In the active awake state 21:
both UE and BS initiated actions are allowed;
the UE may receive DL control information, demodulate and decode the control channel;
the UE may receive DL data.

In the active sleep state 22:
only UE initiated actions are performed;
UL transmissions possible;
Measurements, channel estimation, cell search etc are possible;
Demodulation and decoding of the control channel may be turned off.

The transition 24 from the active sleep state 22 to the active awake state 21:
is triggered by pre-determined rules (pattern);
is immediate with no additional signaling required;
can not be initiated from the transmitter.

The transition 24 from the active awake state 21 to the active sleep state 22:
may be triggered by pre-determined rules (pattern);
may also be initiated from the transmitter, e.g. with a specific command or as a result of transmitting a packet to the receiver;
is immediate with no additional signaling required.

On the contrary to the active state 20, the UE also have an inactive sleeping state denoted with 23. In the inactive sleeping state 23:
the receiver radio of the UE is periodically turned off;
the UE only listens to paging messages from the BS;
the UE is assigned a long RNTI;
the transmitter radio of the UE may also be turned off.

The transition 25 between the active state 20 and the inactive sleep state 23:
the BS may only trigger transitions from inactive sleeping 23 to active 20 state by transmitting explicit wake-up signaling.
When entering the active state 20, the UE will also enter one of the sub-states active awake 21 or active sleep 22 by following a pre-defined rule;
A timer or explicit signaling may trigger transitions from the active 20 to the inactive sleeping state 23.

There are two steps of the invention: principles for sleep rules, and algorithms to select sleep rules suitable in specific scenarios.

In the following when discussing the "active" mode/period it is the active awake state mode/period that is meant and when discussion the "sleep" mode/period it is the active sleep mode/period that is meant.

One straightforward principle is to specify a fixed pattern of active periods and sleep periods. Such a pattern would typically be periodic. For example, in the case of voice (telephony) applications, it could amount to a short active period (a few frames) every 20 ms.

A drawback of a fixed pattern is the inherent conflict between scheduler flexibility and power consumption. If the active period is very short, the sender has little or no freedom as to which receiver to transmit to at what time, which can reduce the transmission efficiency. A longer active period gives the scheduler more freedom but requires the receiver to listen actively for a longer period, reducing the power consumption gain.

A slightly more advanced rules principle is to specify that each active period starts at a predetermined time and ends when a packet has been received, after which the receiver can go back to sleep mode. Such dynamic active periods may be specified to start periodically, e.g. once every 20 ms. If no packet is transmitted during an active period, it extends until the next active period would anyway have started. Alternatively, the active period may be specified to end after a certain time, e.g. 5 ms, if no packet is transmitted.

To shorten the active period for the receiver when there is nothing to receive, the sender may send dummy/empty packets to the receiver in order to force the receiver to go into sleep mode. This can be advantageous especially in low and medium load situations when there is unused transmission capacity available.

More generally, sleep commands may be embedded in the transmission. For instance, the network may send a few packets followed by a command that instructs the terminal to sleep for a certain time interval, or until a certain time when it should wake up.

The sleep rules may also be connected with retransmissions. If a packet has been received in error, and the receiver informs the sender by means of a negative acknowledgement, a new active period can be defined to start as a result. The extent of this active period should be coupled to the nature of retransmissions. For example, it should not start earlier than the earliest time at which a retransmission can possibly occur, e.g. due to delays in transmission and processing of the acknowledgement. Further, if the retransmission scheme mandates that retransmissions shall occur at a certain exact time instant, the active period should be set to only include that time instant.

Another option is to relate the active periods to channel quality reporting from the receiver. Such reporting is present for example in WCDMA HSDPA, in the form of CQI reports that are transmitted with a period that is signaled from the network to the terminal. It may be desirable to keep the period long to limit the amount of radio resources spent on the reporting. A drawback of this is that the network has up-to-date information about the channel quality only directly after a CQI report. The accuracy of that information then reduces as time passes, until the next report. In such cases, it may be advantageous to specify the sleep rule such that each active period begins slightly after a CQI report, so that the network can utilize up-to-date information about the channel quality.

Naturally, sleep rules should be selected dependent on the type of traffic in order to be efficient. This could either be done based on knowledge of the application type (e.g. if it is a speech call or a video call), agreed QoS for the traffic, or based on the observed nature of the traffic.

If explicit information about particular applications is available, e.g. from higher layers, then pre-designed sleep rules can be tabulated for some applications. For instance, a speech application may have a sleep rule where the terminal enters sleep mode immediately upon reception of a data packet, and periodically returns to active mode every 20 ms, as discussed above.

More generally, the desired nature of the radio connection may be known in a parameterized form, e.g. in the form of RAB parameters [ref to 3GPP spec] or other type of QoS agreement. This may for instance include the maximum bit rate, guaranteed bit rate, maximum packet size, and maximum delay. Then the sleep rule can be selected automatically by means of an algorithm. For example, the sleep rule may be designed to enter the active period periodically with a period that is determined from the QoS parameters. The period may be calculated by comparing the maximum incoming traffic bit rate with the estimated bit rate over the radio, such that it is likely that, at each active period, all buffered data can be transmitted in a single transmission. With such an algorithm, the sleep rule may be dynamically updated based on changes in the estimated bit rates.

An alternative may also be to use an adaptive algorithm that determines the sleep rules based on observed traffic characteristics. An example can be to monitor the inter-arrival time between packets for each user and dynamically adapt the sleep rule to this time. This can be done either in the network or in the terminal (or even both), depending on the nature of the control signaling defined to setup the sleep rules.

The invention, if properly implemented, can significantly reduce the power consumption in the terminal, thereby increasing the battery life.

It will be appreciated that at least some of the procedures described above are carried out repetitively as necessary to respond to the time-varying characteristics of the channel between the transmitter and the receiver. To facilitate understanding, many aspects of the invention are described in terms of sequences of actions to be performed by, for example, elements of a programmable computer system. It will be recognized that the various actions could be performed by specialized circuits (e.g. discrete logic gates interconnected to perform a specialized function or application-specific integrated circuits), by program instructions executed by one or more processors, or a combination of both.

Moreover, the invention can additionally be considered to be embodied entirely within any form of computer-readable storage medium having stored therein an appropriate set of instructions for use by or in connection with an instruction-execution system, apparatus or device, such as computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus or device. The computer-readable medium can be, for example but not limited to, an electronic, magnetic, optical, electromagnetic, infrared, or semiconductor system, apparatus, device or propagation medium. More specific examples (a non-exhaustive list) of the computer-readable medium include an electrical connection having one or more wires, a portable computer diskette, a random access memory (RAM), a read only memory (ROM), an erasable programmable read only memory (EPROM or Flash memory), an optical fibre, and a portable compact disc read only memory (CD-ROM).

Thus, a computer-readable medium containing computer program according to a preferred embodiment of the present invention for reducing power consumption of a mobile terminal in a communication network comprising a sender transmitting packet data on a downlink channel to one or more receivers over a radio interface, wherein the computer program performs the step of: defining inactive time instants and listening time instants, during which said receiver is listening for signalling from said sender, whereby less power is consumed during said inactive time instants.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

The invention claimed is:

1. A method of operating a wireless communication device in a wireless communication network, the method comprising:
   establishing an agreement between the wireless communication device and the wireless communication network defining inactive time instances and listening time instances, wherein the wireless communication device is operating in a sleep mode during the inactive time instances and the wireless communication device is operating in an active mode during the listening time instances;
   transitioning between a plurality of modes, wherein the plurality of modes further includes the sleep mode, wherein the wireless communication device does not listen for downlink data transmissions, and the plurality of modes further includes the active mode, wherein the wireless communication device listens for downlink data transmissions;
   while the wireless communication device is operating in the active mode, receiving, by the wireless communication device, control signalling from a transmitter to adjust a length of time for transitioning between a first mode among the plurality of modes and a second mode among the plurality of modes based on one or more sleep rules; and
   transitioning from the first mode to the second mode based, at least in part, on the adjusted length of time.

2. The method of claim 1, wherein:
   transitioning from the first mode to the second mode is based, at least in part, on the one or more sleep rules; and
   transitioning from the second mode to the first mode is based, at least in part, on the one or more sleep rules.

3. The method of claim 1, further comprising receiving, at the wireless communication device, one or more packets from the transmitter while the wireless communication device is operating in the active mode.

4. The method of claim 1, wherein the establishing an agreement further comprises the wireless communication device requesting an agreement from the wireless communication network to define the inactive time instances and the listening time instances.

5. The method of claim 1, further comprising transitioning from one of the first mode and the second mode to a third mode, wherein the wireless communication device listens only to a paging channel while operating in the third mode.

6. The method of claim 5, wherein the third mode comprises a paging state.

7. The method of claim 5, further comprising:
   while the wireless communication device is operating in the third mode, receiving a paging message; and
   transitioning from the third mode to one of the first mode and the second mode based, at least in part, on the wireless communication device receiving the paging message.

8. The method of claim 7, wherein the wireless communication device uses a first type of identifier while operating in the third mode, and wherein transitioning from the third mode to one of the first mode and the second mode comprises receiving signaling indicating a second type of identifier for use by the wireless communication device while the wireless communication device is operating in the first mode or the second mode.

9. The method of claim 5, wherein the wireless communication device uses a first type of identifier while operating in the first mode and while operating in the second mode, and wherein the wireless communication device uses a second type of identifier while operating in the third mode.

10. The method of claim 9, wherein identifiers of the first type are shorter than identifiers of the second type.

11. The method of claim 9, wherein the first type of identifier comprises a short Radio Network Temporary Identifier (RNTI), and wherein the second type of identifier comprises a long RNTI.

12. The method of claim 5, wherein transitioning to the third mode is based, at least in part, on a timer.

13. A wireless communication device operating in a wireless communication network, the wireless communication device comprising:
   processing circuitry configured to:
      establish an agreement between the wireless communication device and the wireless communication network defining inactive time instances and listening time instances, wherein the wireless communication device is operating in a sleep mode during the inactive time instances and the wireless communication device is operating in an active mode during the listening time instances;
      transition between a plurality of modes, wherein the plurality of modes further includes the sleep mode, wherein the wireless communication device does not listen for downlink data transmissions, and the plurality of modes further includes the active mode, wherein the wireless communication device listens for downlink data transmissions;
      while operating in the active mode, receive control signalling from a transmitter to adjust a length of time for transitioning between a first mode among the plurality of modes and a second mode among the plurality of modes based on one or more sleep rules; and
      transition from the first mode to the second mode based, at least in part, on the adjusted length of time.

14. The wireless communication device of claim 13, wherein:
   a transition from the first mode to the second mode is based, at least in part, on the one or more sleep rules; and
   a transition from the second mode to the first mode is based, at least in part, on the one or more sleep rules.

15. The wireless communication device of claim 13, wherein said processing circuitry is further configured to receive one or more packets from the transmitter while the wireless communication device is operating in the active mode.

16. The wireless communication device of claim 13, wherein the establishing an agreement further comprises the wireless communication device requesting an agreement from the wireless communication network to define the inactive time instances and the listening time instances.

17. The wireless communication device of claim 13, wherein said processing circuitry is further configured to transition from one of the first mode and the second mode to a third mode, wherein the receiver listens only to a paging channel while operating in the third mode.

18. The wireless communication device of claim 17, wherein the third mode comprises a paging state.

19. The wireless communication device of claim 17, wherein the processing circuitry is further configured to:
   while operating in the third mode, receive a paging message; and
   transition from the third mode to one of the first mode and the second mode based, at least in part, on receiving the paging message.

20. The wireless communication device of claim 19, wherein the wireless communication device uses a first type of identifier while operating in the third mode, and wherein the transition from the third mode to one of the first mode and the second mode comprises receiving signaling indicating a second type of identifier for use by the wireless communication device while the wireless communication device is operating in the first mode or the second mode.

21. The wireless communication device of claim 17, wherein the wireless communication device uses a first type of identifier while operating in the first mode and while operating in the second mode, and wherein the wireless communication device uses a second type of identifier while operating in the third mode.

22. The wireless communication device of claim 21, wherein identifiers of the first type are shorter than identifiers of the second type.

23. The wireless communication device of claim 21, wherein the first type of identifier comprises a short Radio Network Temporary Identifier (RNTI), and wherein the second type of identifier comprises a long RNTI.

24. The wireless communication device of claim 17, wherein the transition to the third mode is based, at least in part, on a timer.

* * * * *